United States Patent Office 3,166,563
Patented Jan. 19, 1965

---

3,166,563
2-LOWER ALKYL SULFONYL-BENZISOTHIAZOLINE
Peter F. Epstein and George E. Lukes, El Cerrito, Calif., assignors to Stauffer Chemical Company, New York, N.Y., a corporation of Delaware
No Drawing. Filed Oct. 31, 1963, Ser. No. 320,547
2 Claims. (Cl. 260—304)

This invention relates to certain novel compositions of matter. More specifically, the invention relates to certain 1,2-benzisothiazoles. The 1,2-benzisothiazoles of the present invention have the following general structural formula:

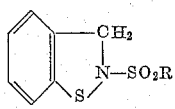

wherein R is a lower alkyl radical. The starting material containing the aromatic ring may be substituted with halogen or lower alkyl.

In general, the compositions of this invention may be made by reacting N-benzyl alkanesulfonamides with a halogenated sulfenyl chloride. We prefer the trichloromethyl sulfenyl chloride as the halogenated sulfenyl chloride. The nature of the substituents in the starting material N-benzyl alkanesulfonamide will determine R and any further substitution in the aromatic ring. If one wishes R to be an n-butyl radical, then N-benzyl n-butanesulfonamide would be used as the starting material.

The compositions of this invention may be used in various manners in the arts. One particularly important use of the compounds is as chemical intermediates in the preparation of pharmaceutical and agricultural chemicals. The compounds may also be used as ore flotation agents, lubricating oil additives and in the compounding of rubber.

In the following example is illustrated a typical preparation that can be used in the preparation of compounds falling within the scope of the present invention.

Example

To a solution of N-2-chlorobenzyl methanesulfonamide (44 parts) and potassium hydroxide (16.8 parts) in water (200 parts) was added 37.2 parts trichloromethane sulfenyl chloride. The temperature of the solution was kept below 20° C. by external cooling during the addition. An exothermic reaction was observed. At the end of the reaction a sticky precipitate was obtained. After treatment with ethanol a less soluble fraction was obtained. The less soluble fraction was purified by successive recrystallizations from ethanol and heptane-toluene. A white crystalline solid with a melting ponit of 137.5–139.5° C. was obtained. This was identified as 4-chloro-2-methanesulfonyl-2,3-dihydro-1,2-benzisothiazole.

*Anaylsis.*—Calculated for $C_8H_8ClNO_2S_2$: C, 38.47; H, 3.23; Cl. 14.20; N, 5.61; S, 25.68. Found: C, 38.61; H, 3.64; Cl, 14.03; N, 5.56; S, 25.59.

Various changes and modifications may be made in the compositions described herein as will be apparent to those skilled in the chemical arts. It is accordingly intended that the present invention shall only be limited by the scope of the appended claims.

We claim:
1. A compound of the formula

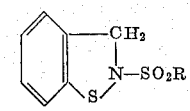

wherein R is lower alkyl.
2. 4 - chloro - 2-methanesulfonyl-2,3-dihydro-1,2-benzisothiazole.

No references cited.